3,320,201
PROCESS FOR PEPTISING SULPHUR MODIFIED CHLOROPRENE LATEX
Anthony Archibald Sparks, Epsom Downs, and Robert Charles Moore, Sutton, England, assignors to The Distillers Company Limited, Edinburgh, Scotland, a British company
No Drawing. Filed June 4, 1964, Ser. No. 372,663
14 Claims. (Cl. 260—29.7)

This invention relates to an improved process for peptising sulphur modified polychloroprene latex and to the sulphur modified polychloroprene rubber isolated from the peptised latex.

By the term sulphur modified polychloroprene latex is meant throughout this specification any synthetic rubber latex formed by polymerising 2-chloro-1,3-butadiene or 2-chloro-1,3-butadiene and a copolymerisable monomer or monomers in the presence of sulphur. By the term peptisation is meant throughout this specification the breakdown of the sulphur modified polychloroprene to give a more plastic product.

Many processes and agents for peptising polychloroprene latex are known, see for instance British Patent number 529,838.

It is an object of the present invention to provide an improved process for peptising sulphur modified polychloroprene latex.

According to the present invention the improved process for the peptisation of sulphur modified polychloroprene latex comprises peptising a sulphur modified polychloroprene latex in the presence of an alkali metal salt of formaldehyde sulphoxylate.

The preferred alkali metal formaldehyde sulphoxylate is the sodium salt. Suitable proportions by weight of sulphoxylate in relation to the weight of dry rubber in the latex are 5 percent or less and the preferred proportion is 1 percent or less.

Any peptising agents such as for example those described in British Patent 529,838 are suitable; particularly suitable peptising agents are a tetra alkyl thiuram disulphide, e.g. tetraethyl thiuram disulphide; a mixture of tetraethyl thiuram disulphide and an inorganic alkaline material such as sodium hydroxide and/or sodium phosphate; a mixture of tetraethyl thiuram disulphide and secondary amine such as diethylamine. The preferred peptising agent is a mixture of a tetra lower alkyl thiuram disulphide and a di-alkyl dithiocarbamate.

By lower alkyl group is meant throughout this specification an alkyl group containing from 1 to 6 carbon atoms. The preferred tetra lower alkyl thiuram disulphide is tetra ethyl thiuram disulphide.

The preferred dialkyl dithiocarbamates are compounds having the general formula:

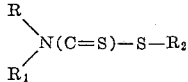

where R and $R_1$ represent alkyl groups containing from 1 to 6 carbon atoms, $R_2$ represents hydrogen, a metal of the alkali or alkaline earth groups, an ammonium radical or substituted ammonium radical. Some examples of these preferred dialkyl dithiocarbamates are dimethyl ammonium dimethyl dithiocarbamate, diethyl ammonium diethyl dithiocarbamate and sodium dimethyl dithiocarbamate.

In carrying out the process of this invention the alkali metal salt of formaldehyde sulphoxylate can be added to the latex at any stage of peptisation. It can be added in the form of an aqueous solution. Emulsifying agents may be present to aid its blending with the latex.

The reaction is preferably carried out under an inert atmosphere such as for example nitrogen.

A suitable temperature range is between 15° C. and 50° C. although higher temperatures may be used provided they do not cause cross linking of the polychloroprene giving a decrease in plasticity. Lower temperatures can be employed to control the rate of peptisation provided they do not cause coagulation of the polychloroprene latex. A suitable pH range is between 8 to 12.3.

In the process using the preferred peptising agents it is preferred to add them to a freshly prepared sulphur modified polychloroprene latex and best results are obtained by adding the alkali metal formaldehyde sulphoxylate to the latex immediately after addition of the tetra lower alkyl thiuram disulphide and dialkyl dithiocarbamate.

A suitable proportion by weight of tetra lower alkyl thiuram disulphide to dry rubber in the latex is in the range 0.1 to 5%. A suitable proportion by weight of dialkyl dithiocarbamate to dry rubber is in the range 0.1 to 3.0%.

The use of an alkali metal salt of formaldehyde sulphoxylate in conjunction with known peptising agents accelerates the rate of peptisation of the latex brought about by these agents. The rubbers isolated from the latex are appreciably lighter in color than those made without formaldehyde sulphoxylate.

The process according to the present invention is illustrated in the following examples.

*Example 1*

A curable sulphur modified polychloroprene latex having a pH of 11.3 was prepared using well known emulsion polymerisation procedures in which a minor proportion of sulphur was present in the emulsion, a wood resin was used as soap and potassium persulphate was used as the polymerisation initiator.

The polymerisation was short-stopped at the desired conversion by the addition of the peptising agent listed in the table. Immediately following this addition an aqueous solution of sodium formaldehyde sulphoxylate was added to give a concentration of 0.5% based on the weight of dry rubber.

The peptised latex was sampled after 1, 3, 5 and 8 hours, the rubber isolated and the Mooney viscosity determined.

The results are presented in the table in which by way of comparison control peptising reactions are given in which the sodium formaldehyde sulphoxylate was omitted. These results show that the presence of sodium formaldehyde sulphoxylate accelerates the rate of peptisation of the latex.

The rubbers made using sodium formaldehyde sulphoxylates were appreciably lighter in color than the control.

TABLE

| Example | Agent added to peptise latex | Mooney viscosity (ML4 1/100° C.) after peptisation for— | | | |
|---|---|---|---|---|---|
| | | 1 hour | 3 hours | 5 hours | 8 hours |
| Control | 2% tetraethyl thiuram disulphide | 140 | 94 | 90 | 84 |
| 1 | 2% tetraethyl thiuram disulphide. Sodium formaldehyde sulphoxylate (0.5%). | 62 | 47 | 40 | 37 |

*Example 2*

A curable sulphur modified polychloroprene latex of pH 11.3 was prepared using well known emulsion polymerisation procedures in which a minor proportion of sulphur was present in the emulsion, a wood resin was used as soap and potassium persulphate was used as the polymerisation initiator.

The polymerisation was short-stopped at the desired conversion by the addition of the peptising agents listed in the table. Immediately following this addition an aqueous solution of sodium formaldehyde sulphoxylate was added to give a concentration of 0.5% based on the weight of dry rubber.

The peptised latex was sampled after 1, 3, 5 and 8 hours, the rubber isolated and the Mooney viscosity determined.

TABLE

| Example | Agent added to peptise latex | Mooney viscosity (ML4 1/100° C.) after peptisation for— | | | |
|---|---|---|---|---|---|
| | | 1 hour | 3 hours | 5 hours | 8 hours |
| Control | 2% tetraethyl thiuram disulphide. Diethylamine (0.5%). | 115 | 86 | 79 | 75 |
| 2 | 2% tetraethyl thiuram disulphide. 0.5% diethylamine. 0.5% sodium formaldehyde sulphoxylate. | 91 | 78 | 69 | 68 |

*Example 3*

A curable sulphur modified polychloroprene latex of pH 11.3 was prepared using the procedure described in Example 1.

A peptising mixture of tetraethyl thiuram disulphide and dimethyl ammonium dimethyl dithiocarbamate was then added to the latex to give a concentration based on the weight of dry curable sulphur modified polychloroprene of 2.4% tetraethyl thiuram disulphide and 0.1% dimethyl ammonium dimethyl dithiocarbamate. The peptising mixture contains 1 part tetraethyl thiuram disulphide 0.05 part dimethyl ammonium dimethyl dithiocarbamate, 2.5 parts toluene (or chloroprene), 0.125 part sodium lauryl sulphate and 3 parts of de-aerated water. Immediately following this addition sodium formaldehyde sulphoxylate was added to give a concentration of 1% based on the weight of dry rubber.

The peptised latex was sampled after 1, 3½ and 5½ hours and the Mooney viscosity of the polymer estimated. The results are presented in the table in which by way of comparison a control peptising reaction is given in which the sodium formaldehyde sulphoxylate has been omitted.

The rubber made using sodium formaldehyde sulphoxylate was appreciably lighter in color than the control.

We claim:
1. A process for the peptisation of sulphur modified polychloroprene latex which comprises peptising a sulphur modified polychloroprene latex in the presence of an added alkali metal salt of formaldehyde sulphoxylate.
2. A process as claimed in claim 1 wherein the alkali metal salt of formaldehyde sulphoxylate is sodium formaldehyde sulphoxylate.
3. A process as claimed in claim 1 wherein the proportion by weight of the alkali metal salt of formaldehyde sulphoxylate to dry rubber in the latex is less than 1 percent.
4. A process as claimed in claim 1 wherein the latex is peptised with a tetra lower alkyl thiuram disulphide.
5. A process as claimed in claim 1 wherein the latex is peptised with tetra ethyl thiuram disulphide.
6. A process as claimed in claim 1 wherein the latex is peptised with tetra ethyl thiuram disulphide and diethylamine.
7. A process as claimed in claim 1 wherein the latex is peptised with a tetra lower alkyl thiuram disulphide and a dialkyl dithiocarbamate.
8. A process as claimed in claim 7 wherein the tetra lower alkyl thiuram disulphide is tetraethyl thiuram disulphide.
9. A process as claimed in claim 7 wherein the dialkyl dithiocarbamate is dimethyl ammonium dimethyl dithiocarbamate.
10. A process as claimed in claim 7, wherein the proportion by weight of tetra lower alkyl thiuram disulphide to dry rubber in the latex is in the range 0.1 to 5 percent.
11. A process as claimed in claim 7, wherein the proportion by weight of dialkyl dithiocarbamate to dry rubber in the latex is in the range 0.1 to 3.0 percent.
12. A process as claimed in claim 8 wherein the proportion by weight of tetra ethyl thiuram disulphide to dry rubber in the latex is in the range 0.1 to 5 percent.
13. A process as claimed in claim 9 wherein the proportion by weight of dimethyl ammonium dimethyl dithiocarbamate to dry rubber in the latex is in the range 0.1 to 5 percent.

TABLE

| Example | Agent added to peptise latex | Mooney viscosity (ML4 1/100° C.) after peptisation for— | | |
|---|---|---|---|---|
| | | 1 hour | 3½ hours | 5½ hours |
| Control | Tetraethyl thiuram disulphide/dimethyl ammonium dimethyl dithiocarbamate. | 88 | 59 | 58 |
| 3 | Tetraethyl thiuram disulphide/dimethyl ammonium dimethyl dithiocarbamate sodium formaldehyde sulphoxylate. | 54 | 32 | 31 |

14. A process for the peptisation of a sulphur modified polychloroprene latex which comprises peptising a sulphur modified polychloroprene latex with a peptising agent selected from the group consisting of tetra ethyl thiuram disulphide and a mixture of tetra ethyl thiuram disulphide and a member selected from the group consisting of sodium hydroxide, sodium phosphate, diethylamine, dimethyl ammonium dimethyl dithiocarbamate, diethyl ammonium diethyl dithiocarbamate and sodium dimethyl dithiocarbamate in the presence of less than one percent by weight of added sodium formaldehyde sulphoxylate based on the weight of dry rubber in the latex.

References Cited by the Examiner

UNITED STATES PATENTS

| 3,015,642 | 1/1962 | Bawn et al. | 260—29.7 |
| 3,235,527 | 2/1966 | Sparks | 260—29.7 |

FOREIGN PATENTS 529,838  11/1940  Great Britain.

SAMUEL H. BLECH, *Primary Examiner.*

J. T. GOOLKASIAN, J. ZIEGLER, *Assistant Examiners.*